Dec. 30, 1941.   J. L. ANDERSON   2,268,368
WELDING MACHINE
Filed April 21, 1939   4 Sheets-Sheet 2
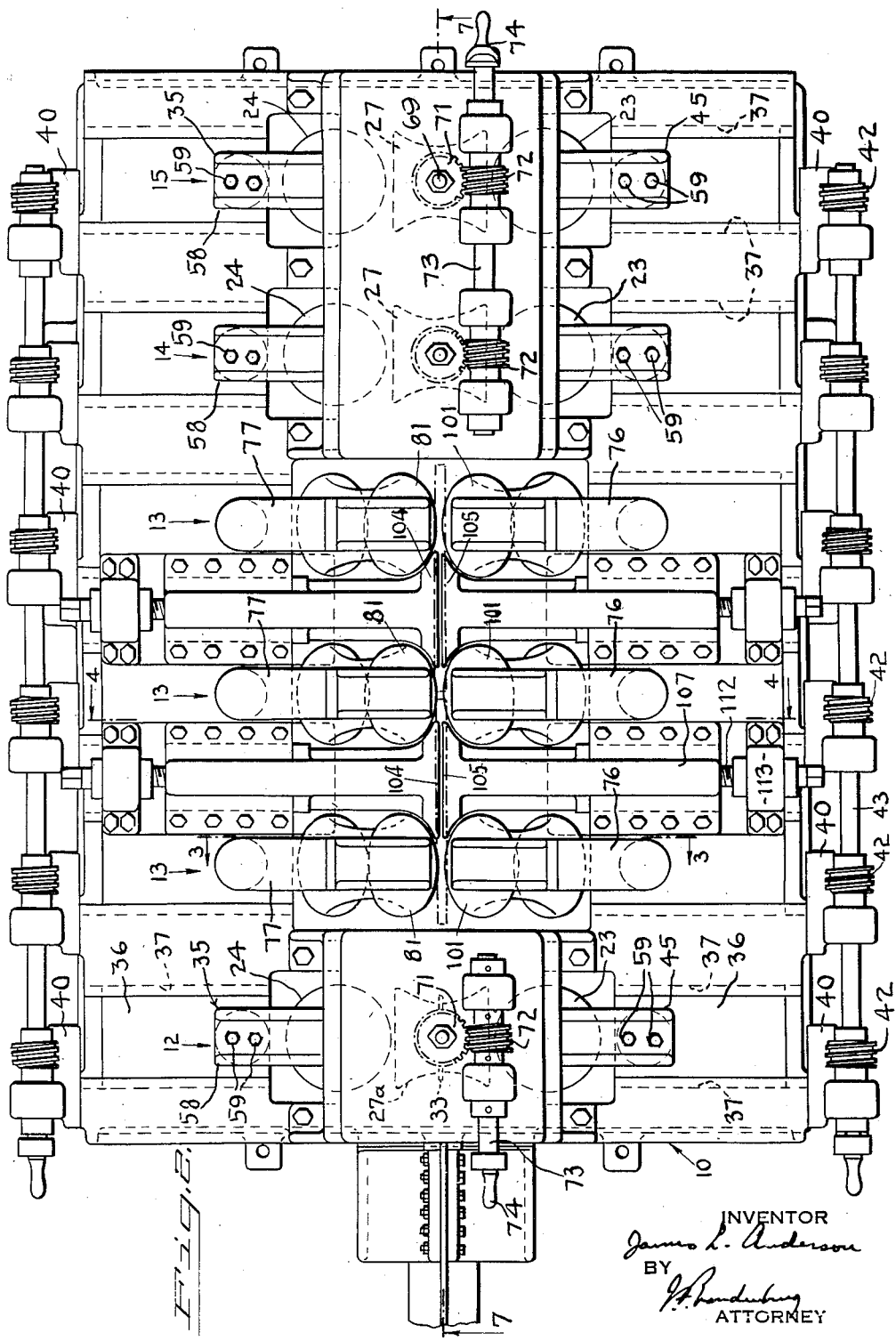
INVENTOR
James L. Anderson
BY
ATTORNEY

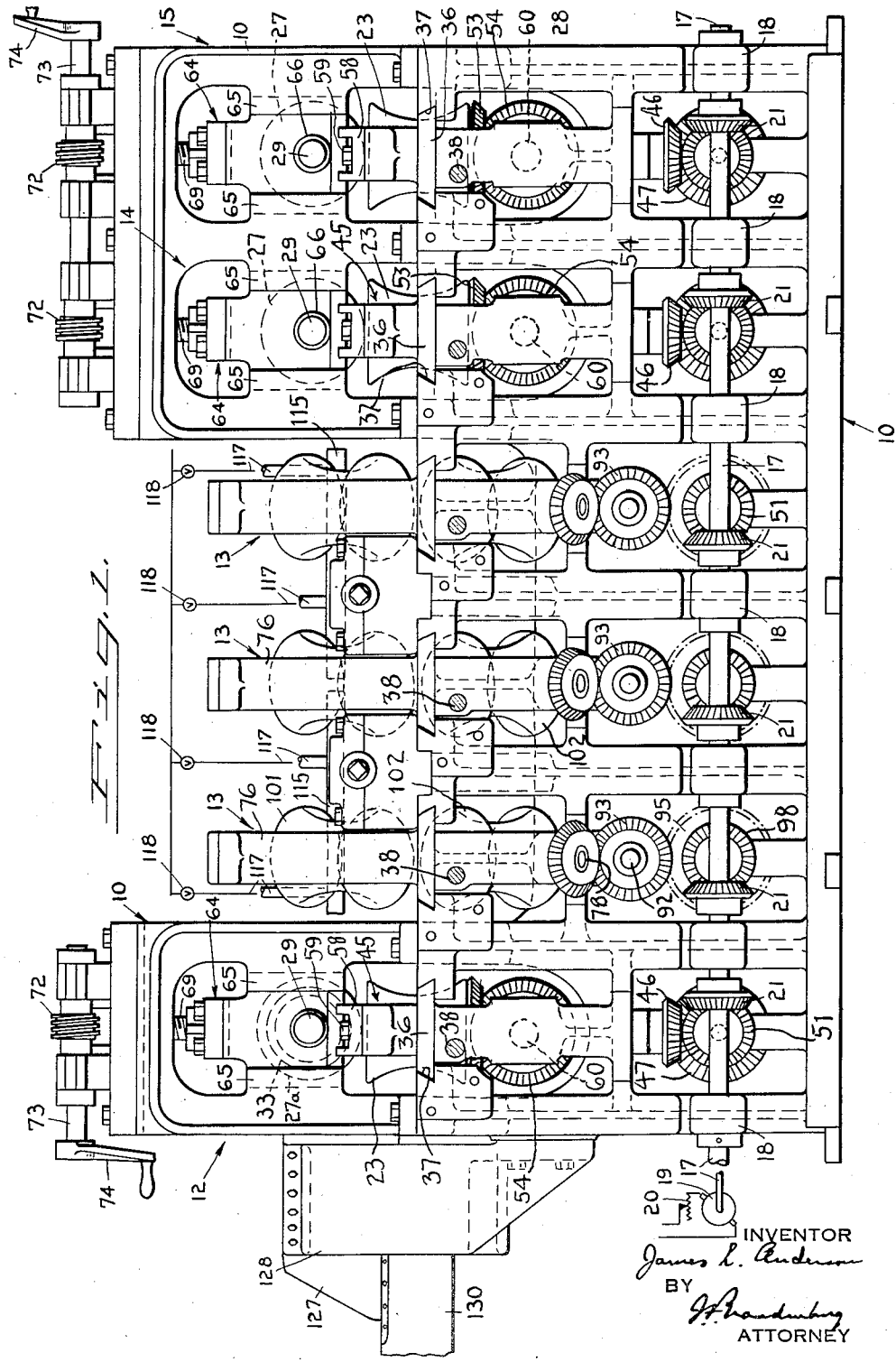

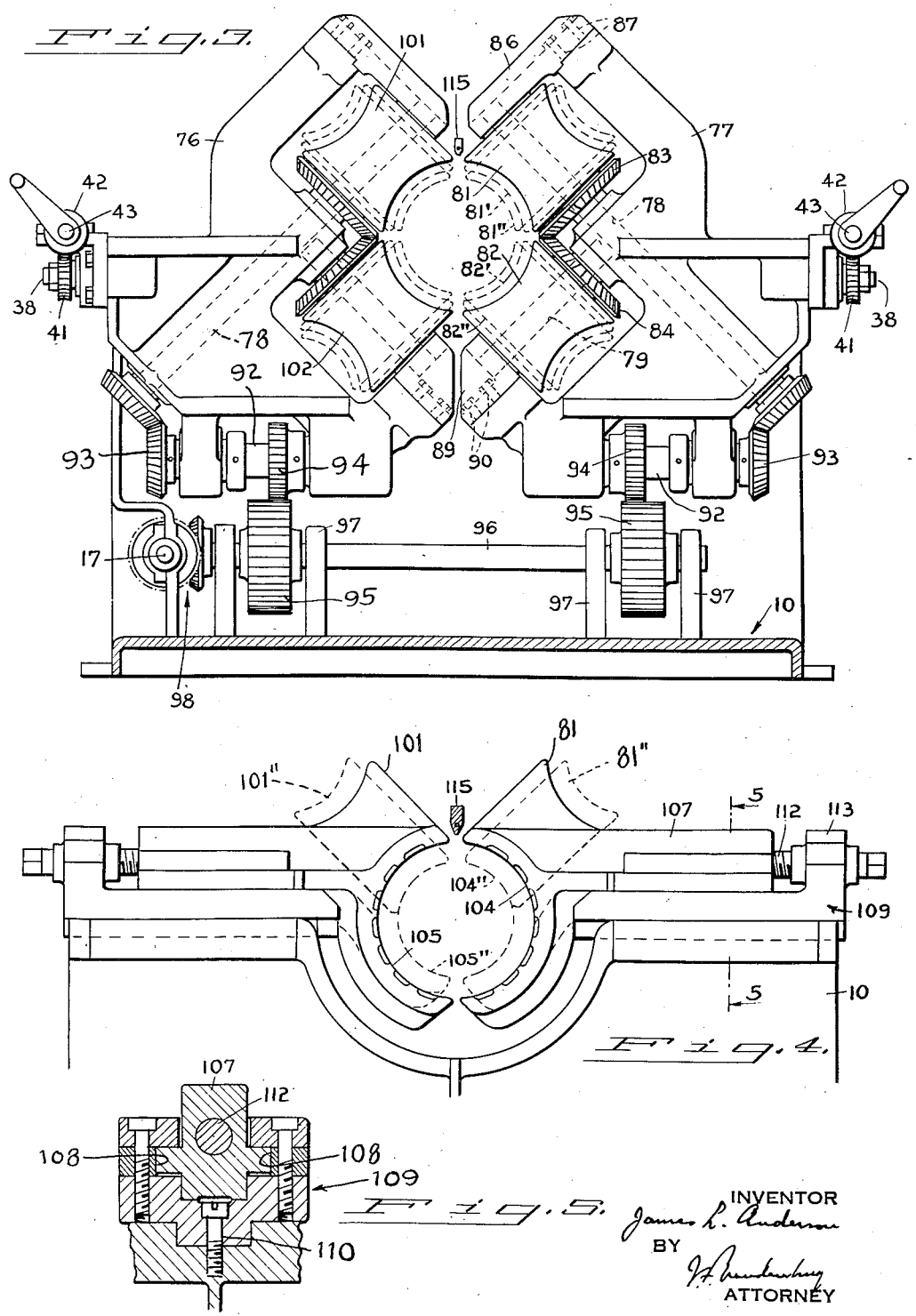

Dec. 30, 1941.   J. L. ANDERSON   2,268,368
WELDING MACHINE
Filed April 21, 1939     4 Sheets-Sheet 4
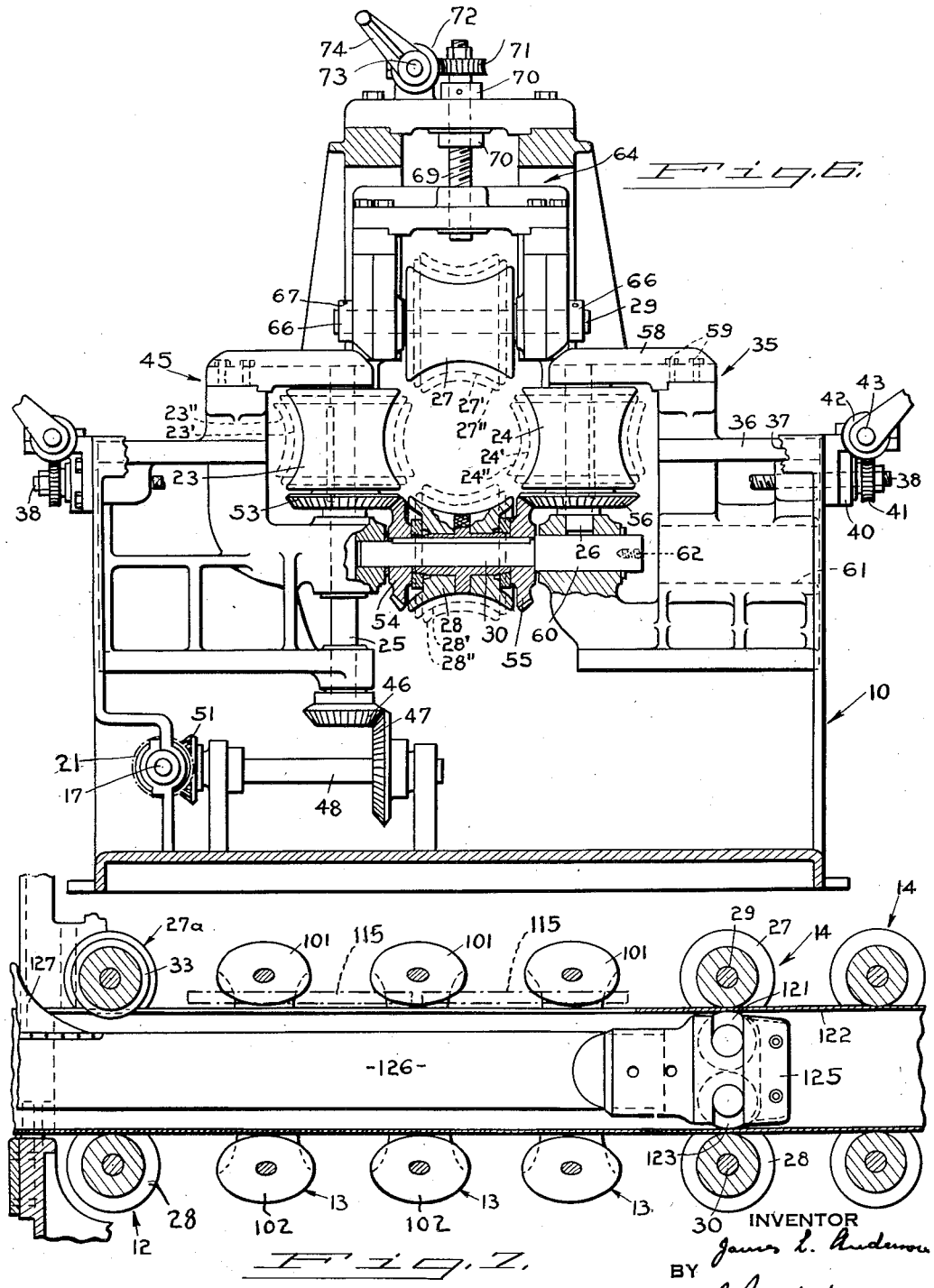

Patented Dec. 30, 1941

2,268,368

UNITED STATES PATENT OFFICE 2,268,368

WELDING MACHINE

James L. Anderson, Closter, N. J., assignor to Air Reduction Company, Incorporated, New York, N. Y., a corporation of New York Application April 21, 1939, Serial No. 269,157

10 Claims. (Cl. 113—59)

This invention relates to machines for welding tubular objects, such as range boilers, or pipes or tubes of relatively large diameter.

It is an object of the invention to provide improved apparatus for welding the longitudinal seam of a range boiler, but the apparatus is not limited to such use and can be employed for the welding of tubular work-pieces generally.

Another object of the invention is to provide an improved machine for welding range boilers of different sizes. This object is attained by having interchangeable rolls of different sizes that can be put on the same shafts or axles to accommodate range boilers of different size. Larger rolls are used for the smaller boilers because the increased diameter of the rolls reduces the diameter of the pass between them.

One feature of the invention relates to novel driving mechanism for moving the range boilers through the machine and past the welding apparatus at uniform speed.

The invention includes novel power-driving mechanism for the rolls with special constructions for replacing the rolls with those of different size with a minimum of disturbance of the driving mechanism. Another feature relates to roll driving mechanism which is not disturbed by adjustment of the rolls toward and from one another.

Other objects, features and advantages of the invention will appear or be pointed out as the specification proceeds.

In the accompanying drawings, forming part hereof:

Fig. 1 is a side elevation, partly broken away, of a welding machine embodying the invention.

Fig. 2 is a top plan view of the welding machine shown in Fig. 1.

Figs. 3 and 4 are sectional views, taken on the lines 3—3 and 4—4, respectively, in Fig. 2.

Fig. 5 is a sectional view on the line 5—5 of Fig. 4.

Fig. 6 is an end view, partly in section and partly broken away, of the welding machine shown in the preceding views.

Fig. 7 is an enlarged, central vertical section through a portion of the machine shown in the other views, but with a mandrel and rollers located inside of a range boiler or other tubular work-piece passing through the machine.

The welding machine shown in the drawings includes a stationary frame 10, which is anchored to a floor or other support. On the frame there are a number of roll stands. The expression "roll stand" is used herein to designate a group of rolls defining a pass, through which the work travels, and the axles, bearings, and other supports of the rolls, but the frame supports of the different roll stands are not necessarily separate from one another.

The range boiler or other work first enters a feed roll stand 12, then passes through three confining roll stands 13, and finally through two other roll stands 14 and 15, the functions of which will be explained.

Some or all of the rolls of each roll stand are driven by power from a drive shaft 17 that extends the entire length of the frame 10 and turns in bearings 18 on the frame. The shaft 17 is driven by an electric motor 19 equipped with a variable speed control device 20 that is used to regulate the speed at which the feed rolls and other rolls advance the work-piece through the machine.

There are bevel gears 21 secured to the drive shaft 17 at spaced points along the length of the shaft. One of these gears 21 supplies the power for each of the roll stands 12—15.

Each of the roll stands 12, 14 and 15 is similar in construction, and a description of the last roll stand 15, shown in Fig. 6, will explain the construction of the roll stand 14 and also the feed roll stand 12 into which the tube blank or work-piece first enters.

The roll stand 15 includes two rolls 23 and 24 that turn on substantially vertical shafts 25 and 26, respectively. This roll stand 15 includes also two rolls 27 and 28 that turn on substantially horizontal shafts 29 and 30, respectively. Corresponding parts in the roll stands 12 and 14 are indicated by the same reference characters as in roll stand 15.

The rolls 23, 24, 28 and 29 form a pass of substantially circular contour and of a predetermined diameter. If that diameter is, for example, 16 inches and at some other time it is desired to use the machine for welding range boilers or tubes of 14 inches diameter, the rolls 23, 24, 28 and 29 are replaced with rolls one inch larger in diameter, such rolls being shown in dotted lines in Fig. 6 and indicated by the reference characters 23', 24', 28' and 29'. For tubes of 12 inches diameter still larger rolls 23", 24", 28" and 29" are used, the pass defined by the rolls being substantially circular in each case.

A top roll 27ª (Figs. 1 and 2) in the feed roll stand has a central ridge or fin 33 that extends between the edge faces of the seam of the range boiler or other work-piece, to separate the edges if necessary, and to keep the seam always at the top of the work-piece so that the seam will pass under the torch or other high-intensity heating instrumentality.

The shaft 26 is held at both ends by a slidable frame 35 (Fig. 6) which has a gib 36 running in ways 37 in the main frame 10 of the machine. A lead screw 38 threads through the frame 35. The lead screw 38 is held against endwise movement by thrust bearings in a bracket 40 in the main frame 10, and the lead screw has a worm wheel 41 at its outer end. The worm wheel 41 is turned by a worm 42 on a shaft 43. Similar parts at the other roll stands are indicated by corresponding reference characters.

The shaft 25 is held in a frame 45 which has a gib that slides in ways in the main frame 10, in response to rotation of a lead screw 38, in the same manner as the frame 35. The shaft 25 extends below the bottom of the frame 45 and has a bevel gear 46 at its lower end. The bevel gear 46 meshes with another bevel gear 47 secured to a countershaft 48. The bevel gears 46 and 47 have large teeth so that they remain in mesh and in working relation with one another in spite of adjustment of the side frame 45 with respect to the stationary frame 10. Power is transmitted from the drive shaft 17 through a gear 21 on the drive shaft that meshes with a gear 51 secured to the end of the countershaft 48.

The shaft 25 drives the roll 23 and a bevel gear 53 keyed to the shaft at the lower end of the roll 23. The bevel gear 53 meshes with a gear 54 keyed to the shaft 30 with the lower roll 28. A gear 55 keyed to the shaft 30 on the other side of the roll 28 transmits power to the roll 24 through a bevel gear 56 on the shaft 26 just below the roll 24. The gears 53—56 have teeth deep enough to permit adjustment of the side frames 35 and 45 without disturbing the driving connections between the rolls.

The upper end of the frame 35 is a casting 58 that is detachably secured to the other part of the frame 35 by screws 59. The bearing for the upper end of the shaft 26 is in the casting 58. When the roll 24 is to be removed, the casting 58 is disconnected from the main body of the frame 35 and the roll 24 can then be lifted off the shaft 26. The other side roll 23 is removed from the shaft 25 in the same way that roll 24 is removed from shaft 26.

When the roll 28 is to be replaced, the shaft 30 is withdrawn to the right in Fig. 6. At its right end the shaft 30 has an enlarged end portion 60 that turns in a bearing in the frame 35. The shaft 30 can be withdrawn from the frame through an opening 61. There is a socket 62 in the end of the shaft 30 with threads into which a pulling tool can be screwed for withdrawing the shaft 30 when the roll 28 is to be replaced.

The upper roll 27 has its axle or shaft 29 supported in bearings in a movable frame 64 that slides in guides 65 (Fig. 1) in the main frame 10. The shaft 29 is held against endwise displacement by collars 66 at opposite ends of the shaft (Fig. 6). A set screw 67 that holds one of the collars 66 on the shaft 29 can be loosened and the collar removed from the shaft 29 when the shaft is to be withdrawn from the roll 29 and inserted in a larger roll 29' or 29''.

The upper roll 27 can be adjusted toward or from the lower roll 28 to control the pressure on a tube or other work-piece by means of a jack screw 69 that threads through the top of the movable frame 64. The jack screw 69 is held against axial movement with respect to the main frame 10 by thrust bearings 70. A worm wheel 71 keyed to the upper end of the screw 69 is rotated by a worm 72 on a shaft 73 that is rotated by a crank 74.

Each roll stand 13 includes two frames 76 and 77 (Fig. 3) that slide toward and from one another in a manner similar to the frames 35 and 45 and in response to the operation of lead screws 38 rotated by worm wheels 41 from a worm 42 on a shaft 43.

The frame 77 supports two shafts 78 and 79 with axes at substantially right angles to one another in a vertical plane. Rolls 81 and 82 can be put on the shafts 78 and 79, respectively, and can be replaced with larger rolls 81' and 82' or 81'' and 82''. Bevel gears 83 and 84 on the shafts 78 and 79 mesh with one another and cause the shafts and rollers to rotate in opposite directions. The rolls 81, 82 and gears 83, 84 are keyed to the shafts 78, 79.

A casting 86 that forms the upper end of the frame 77 is detachably connected to the remainder of the frame by screws 87. The upper end of the shaft 78 turns in a bearing in the casting 86. When the roll 81 is to be removed, the casting 86 is first disconnected from the remainder of the frame 77 by taking out the screws 87.

The roll 79 is removed from the machine by detaching from the frame 77 a casting 89 which serves as the bearing for the lower end of the shaft 79. The casting 89 is connected with the frame 77 by screws 90.

At the bottom of the slidable frame 77 there is a shaft 92 that rotates in bearings in the frame. A bevel gear 93 secured to one end of the shaft 92 meshes with a similar gear at the bottom of the shaft 78. A spur gear 94 fixed on the shaft 92 is driven by a wide-face gear 95 on a counter-shaft 96 which turns in bearings 97 of the main frame 10. The counter-shaft 96 is rotated by the power shaft 17 through bevel gearing 98. Adjustment of the frame 77 toward or from the frame 76 causes movement of the gear 94 with respect to the gear 95 parallel to the axes of the gears. The gear 95 is wider than the gear 94 by an amount at least as great as the intended adjustment of the frame 77, and the gear 94 is therefore in mesh, across the full width of its teeth, with the gear 95 regardless of the adjustment of the frame 77.

The frame 76 supports rolls 101 and 102 which are supported and driven in the same way as the rolls 81 and 82. The construction of all of the roll stands 13 is similar, and the corresponding parts are indicated by the same reference characters.

In order to control the tubular work-piece between the roll passes of the roll stands 13, guides 104 and 105 (Fig. 4) are provided between the roll stands. These guides have arcuate faces of almost 180° so that they cover most of the peripheral extent of a tubular work-piece that is passing through the roll stands 13. The faces of the guides 104, 105 are preferably grooved diagonally to reduce friction with the tube and to provide spiral channels along the tube surface for the flow of envelope gases away from the heating agencies when oxyacetylene flames are used.

Behind each of the guides 104, 105, and preferably integral with the guide, is a slide 107 which runs in guides 108 (Fig. 5) in a detachable frame 109 that is fastened to the main frame 10 of the machine by screws 110. Each slide 107 is moved by a lead screw 112 which threads into the slide 107 and is held against axial displacement by thrust bearings contacting with a lug 113 (Fig. 4) of the detachable frame 109.

The guides 104 and 105 may be replaced by guides 104" and 105" when the machine is to be used for welding tubes or range boilers of a diameter different from that corresponding to the curvature of the guides 104 and 105. Every time the rolls are changed for a different size of work, the guides 104 and 105 are changed also because the curvature of the faces of the guides should always be the same as the curvature of the concave faces of the rolls.

The guides 104, 105 extend as far as possible between the rolls of successive roll stands 13. Fig. 2 shows the ends of the guides 104, 105 shaped to extend further into the space between the rolls 81 and 101.

There are two torches 115 at the top of the roll passes 13 in position to heat the edge faces of a tube blank to a welding condition during the passage of the blank through the roll passes 13. In some of the views the torches are shown in dot-and-dash lines so as not to interfere with the showing of other parts.

The region at which the weld is complete depends upon a number of factors including the speed at which the tube blank is advanced through the machine, and the amount of heat generated by the torches. It is a feature of the preferred embodiment of the invention that each of the torches 115 has the first half of its flame jets supplied from one distributing chamber and the last half of its flame jets supplied from a different chamber so that all or only one-half of the flame jets can be used at any one time. Each of the distributing chambers of the torches are supplied with gas through a separate pipe 117 controlled by its own independent valve 118.

Each torch 115 is a multi-jet oxyacetylene torch, preferably single row, but it will be understood that the invention is not limited to such heating means, and that, as to the broader aspects of the invention, the torches 115 are merely representative of a seamwise extended system of high-intensity heating agencies.

Fig. 7 shows rollers within the tubular work-piece between the rolls 27 and 28 of the roll stand 14. These rollers include a top roller 121 that cooperates with the upper roll 27 to roll the freshly made weld of a welded tube or boiler 122. The roller 121 is supported by a lower roller 123 that rests on the bottom of the tube where the tube is supported by the lower roll 28.

The rollers 121 and 123 are held against movement lengthwise of the tube 122 by a holder 125 which has slots into which extend necks on the opposite ends of the rollers. The holder 125 is secured to a mandrel 126 which connects with a fin 127 fastened to a bracket 128 (Fig. 1) bolted to the main frame 10 and forming a part of the stationary frame of the machine. There is a concave shelf or support 130 on the bracket 128 in position to serve as a rest on which the end of a tube blank or boiler shell can be held at the correct elevation to be pushed into the roll pass of the feed roll stand 12. The split or seam of the tube blank or boiler shell permits it to pass the fin 127, one edge of the seam passing to either side of the fin. The fin 127 thus positions the seam in line with the fin 33 of the feed roll 27ᵃ.

In the operation of the apparatus the fin 33 holds the edges at a predetermined distance from one another. The gathering or confining rolls of the roll stands 13, and the guides 104 and 105, prevent the edges from spreading apart when the heat is applied, and are adjusted to maintain the desired spacing of the edges.

With the single-row-flame torches 115, the seam edges are fused and flow together into a puddle which hardens beyond the heating region to form the weld. For high-speed operation, all of the torch flames are used, all of the gas supply valves 118 being open, but for low-speed operation only the second (right-hand) torch, or the latter half of the second (right-hand) torch is used. The speed of travel of the seam edges past the torches 115 is correlated with the heating to obtain an accurate control of the welding conditions by means of the variable speed device 20 (Fig. 1).

The molten metal becomes plastic and hardens somewhere between the end of the second torch 115 and the roll pass of roll stand 14. The metal of the weld is hot and still relatively soft when it passes through the roll pass 14 in which the seam is rolled down between the outside roll 27 and the inside roll 121, as shown in Fig. 7. The final roll stand 15 can be used to straighten the work if there is distortion caused by the heating of the metal along the seam while that at the bottom of the work remains cool.

The preferred embodiment of the invention has been described. Terms of orientation in the description and claims are, of course, relative. Other embodiments of the invention can be made and some features of the invention can be used without others.

I claim:

1. A tube or range boiler welding machine including successive roll stands through which a tubular work-piece passes, a main frame supporting the roll stands, one of said roll stands comprising two side frames and bearings on which said side frames slide on the main frame, an upright shaft held by each of the side frames in bearings in the side frame, one at each end of the shaft, fastenings detachably connecting the upper bearing for each upright shaft to the remainder of the side frame of which the bearing forms a part, a roll on each of said upright shafts, a bottom roll, a support for said bottom roll comprising a horizontally extending shaft with one end supported by each of the side frames but movable longitudinally with respect to the side frame to permit movement of said side frames toward and from one another and to permit removal of the shaft from the bottom roll, a top roll, an axle for said roll, a top frame in which the axle is journaled, said axle being longitudinally movable to withdraw it from the top frame for replacement of the top roll, means for shifting the top frame up and down to adjust the position of the top roll with respect to the other rolls, motion transmitting gearing between the bottom and side rolls, and means for driving said rolls.

2. A tube or boiler welding machine including a roll stand with two side frames, a main stationary frame on which the side frames are movable toward and from one another, two rolls supported by each side frame, shafts by which the rolls are supported, said shafts being one above the other and extending at substantially right angles to one another and at angles of approximately 45° to the vertical, bearings at both ends of each shaft, the upper bearing of the top shaft and the lower bearing of the lower shaft being detachable from the remainder of the side frame of which they form a part to permit removal of the rolls, gearing connecting the two shafts in each side frame, and power means for driving one shaft of each side frame, said power means including a counter-shaft that turns in bearings fixed with respect to the main frame of the machine, spur gears on the counter-shaft, one for each side frame, gearing on each side frame including a spur gear that meshes with one of the spur gears on the counter-shaft, one of said spur gears for transmitting power to each side frame having a wide face to provide for adjustment of the side frames with respect to the main frame.

3. In a machine for welding the longitudinal seam of a tubular work-piece, a feed roll stand, a seamwise extending system of high-intensity heating instrumentalities, restraining means including a plurality of other roll stands intermediate the ends of the system of high-intensity heating instrumentalities, each of said other roll stands including rolls in position to contact with the work-piece along the region that is being acted upon by said heating instrumentalities and to hold the edge faces in a definite spaced relation to the heating instrumentalities and to each other, said rolls defining successive passes within the longitudinal extent of the system of heating instrumentalities, and power driving mechanism connected with each of said other roll stands and with all or most of the rolls in each of said other roll stands.

4. In a tube welding machine, a plurality of rolls defining a pass through which a tube blank travels, roll supporting means including a slide for moving at least one of said rolls toward and from another roll to adjust the size of the pass between the rolls, power mechanism for driving the rolls including meshing spur gears, one of which moves axially with said slide and relative to the other gear, and one of which has a face wider than the other to keep said gears in mesh in spite of the movement of the slide.

5. In a welding machine, feed rolls for advancing a tube blank, power means for causing a tube blank to advance through the feed rolls, means for controlling the speed of operation of said power means, a heating system of variable seamwise extent and comprising a plurality of heating agencies beyond the feed rolls and spaced lengthwise along the seam for welding the seam edges, and control means for varying the seamwise extent of said system of heating agencies and correlating the extent of said system and the speed of operation of the power means to cause the region of welding to move closer to or further from the feed rolls.

6. A tube or boiler welding machine including a seamwise extending system of heating agencies, two or more roll stands located under and intermediate the ends of said system of heating agencies in position to control the relation of the seam edges with respect to one another while said edges are moving past the system of heating agencies and means operable to control the seamwise extent of the system of heating agencies to effect welding of the seam edges at different roll stands.

7. A machine for welding the longitudinal seam of a tube or boiler blank including in combination a feed roll stand with rolls defining a pass through which the tubular work-piece passes into the machine, a fin extending between the seam edges to space said edges and guide the seam, oxyacetylene heating torch means beyond the feed roll stand and with jet orifices in positions to direct a seamwise extending system of heating flames toward the work-piece over a substantial length of the seam, independent distributing chambers in the torch means supplying gas to the jet orifices over different portions of the length of the torch means, valves for independently controlling the supply of gas to the different distributing chambers of the torch means, and several roll stands beyond the feed roll stand with confining rolls in positions to control the spacing of the seam edges while the work-piece is passing said torch means, another roll stand beyond the confining roll stands and beyond the welding region with rolls in contact with the outside of the work-piece and rollers in contact with the inside of the work-piece cooperating with the outside rolls to roll the welded seam.

8. A machine for welding the longitudinal seam of a tube or boiler blank including in combination a feed roll stand with rolls defining a pass through which the tubular work-piece enters the machine, a fin extending between the seam edges to space said edges and guide the seam, oxyacetylene heating torch means beyond the feed roll stand and with jet orifices in positions to direct a seamwise extending system of heating flames toward the work-piece over a substantial length of the seam, independent distributing chambers in the torch means supplying gas to the jet orifices over different portions of the length of the torch means, valves for independently controlling the supply of gas to the different distributing chambers of the torch means, and a number of other roll stands beyond the feed roll stand, each of said other roll stands including confining rolls contacting with the work-piece intermediate the ends of the torch means and controlling the spacing of the seam edges as they pass said torch means.

9. In a machine for welding tube blanks, a seamwise extending heating device for raising the seam edges of a traveling tube blank to a welding condition, a number of successive roll stands through which the tube blank travels while passing from one end to the other of said heating devices, each of said stands including rolls that confine the tube blank and maintain the edges in a desired spaced relation during the heating of said edges, and restraining guides, between the roll stands, shaped to the desired contour of the tube blank between the roll stands and disposed to control the spacing of the edges while said edges are traveling between successive roll stands.

10. A tube welding machine comprising a seamwise-extending heating device for raising the edges of a tube blank to a welding condition, successive roll stands in position to receive the portion of a tube blank that is passing from one end to the other of the seamwise-extended heating device, rolls in each of said stands forming a pass intermediate the ends of the heating device, apparatus for causing relative movement of rolls on opposite sides of the roll pass to control the spacing of the seam edges, guides between the roll stands, said guides having surfaces shaped to the contour of the outside surface of the tube blank for controlling the seam edge spacing along the runs of the tube between the roll stands and intermediate the ends of the heating device, and means independent of the roll adjusting apparatus for adjusting the spacing of the guides.

JAMES L. ANDERSON.